United States Patent
Sutarwala et al.

(10) Patent No.: US 8,710,802 B2
(45) Date of Patent: Apr. 29, 2014

(54) METHOD AND APPARATUS FOR CHARGING A POWER PACK OF A PORTABLE ELECTRONIC DEVICE

(75) Inventors: Taha Shabbir Husain Sutarwala, Toronto (CA); Mallikarjun Boda, Irving, TX (US); Yu William Feng, Waterloo (CA); Jonathan Quinn Brubacher, Waterloo (CA); Chee-Ming Jimmy Wu, Toronto (CA)

(73) Assignee: BlackBerry Limited, Waterloo (CA)

( * ) Notice: Subject to any disclaimer, the term of this patent is extended or adjusted under 35 U.S.C. 154(b) by 719 days.

(21) Appl. No.: 12/907,674

(22) Filed: Oct. 19, 2010

(65) Prior Publication Data

US 2011/0279092 A1 Nov. 17, 2011

Related U.S. Application Data

(60) Provisional application No. 61/334,779, filed on May 14, 2010.

(51) Int. Cl.
*H02J 7/00* (2006.01)
*H02J 7/04* (2006.01)

(52) U.S. Cl.
USPC .......................... 320/134; 320/144; 320/153

(58) Field of Classification Search
CPC ...................................................... H02J 7/0031
USPC ........................................................ 320/134
See application file for complete search history.

(56) References Cited

U.S. PATENT DOCUMENTS

| 6,229,283 | B1 | 5/2001 | Kalogeropoulus et al. |
| 6,707,273 | B1 | 3/2004 | Gignac |
| 6,894,459 | B2 | 5/2005 | Howard et al. |
| 2004/0135552 | A1 | 7/2004 | Wolin et al. |
| 2007/0222419 | A1 | 9/2007 | Wolf et al. |
| 2009/0085519 | A1* | 4/2009 | Kim ............................... 320/134 |
| 2009/0295334 | A1* | 12/2009 | Yang et al. ................... 320/134 |
| 2009/0295335 | A1* | 12/2009 | Yang et al. ................... 320/134 |

FOREIGN PATENT DOCUMENTS

| EP | 1775654 | 4/2007 |
| EP | 1837973 | 9/2007 |
| EP | 2003762 | 12/2008 |
| EP | 2149958 | 2/2010 |
| WO | 2006135838 | 12/2006 |

OTHER PUBLICATIONS

European Search Report dated Mar. 16, 2011. In corresponding application No. 10188117.5.
Office Action mailed May 17, 2013, in corresponding Canadian patent application No. 2,739,913.

* cited by examiner

*Primary Examiner* — Edward Tso
*Assistant Examiner* — Ahmed Omar
(74) *Attorney, Agent, or Firm* — Novak Druce Connolly Bove + Quigg LLP

(57) ABSTRACT

A method includes: receiving a temperature indication, the temperature indication being a function of a temperature of a power pack of a portable electronic device; determining, as a function of the temperature indication, whether the temperature is within an elevated operating temperature range; and reducing a charge termination voltage and a charging current when the temperature is within the elevated operating temperature range.

15 Claims, 6 Drawing Sheets

METHOD AND APPARATUS FOR CHARGING A POWER PACK OF A PORTABLE ELECTRONIC DEVICE

CROSS-REFERENCE TO RELATED APPLICATIONS

This application is claims priority to U.S. Patent Application No. 61/334,779, filed May 14, 2010, the entire contents of which application are incorporated herein by reference.

TECHNICAL FIELD

The present embodiments relate to charging a power pack, such as a battery pack, of a portable electronic device, and in particular, charging at elevated temperatures.

BACKGROUND

Rechargeable power packs can supply energy to a load, and can also have energy supplied to them so that they may be reused. Rechargeable power packs, such as those providing power to a portable electronic device, are typically charged using an auxiliary charging device such as a charging dock, a wall charger or an in-vehicle charger. Charging commonly takes place at ambient room temperatures, however, in some cases, charging takes place at elevated temperatures. For example, when charging a portable electronic device in a vehicle, the temperature inside the vehicle may be elevated due to a greenhouse or other effect.

DRAWINGS

The following figures set forth embodiments in which like reference numerals denote like parts. Embodiments are illustrated by way of example and not by way of limitation in the accompanying figures.

DETAILED DESCRIPTION

There is provided herein a method including: receiving a temperature indication, the temperature indication being a function of a temperature of a power pack of a portable electronic device; determining, as a function of the temperature indication, whether the temperature is within an elevated operating temperature range; and reducing a charge termination voltage and a charging current when the temperature is within the elevated operating temperature range.

There is provided herein a portable electronic device including: a processor, the processor electrically coupled to a temperature sensor coupled to a power pack; a power pack electrically coupled to the processor; wherein the processor receives a temperature indication from the temperature sensor, the temperature indication being a function of a temperature of the power pack; determines, as a function of the temperature indication, whether the temperature is within an elevated operating temperature range; and when the temperature is within the elevated operating temperature range, controls a power management subsystem to reduce a charge termination voltage and a charging current.

There is provided herein a computer-readable medium having computer readable instructions stored thereon for execution by a processor to: receive a temperature indication, the temperature indication being a function of a temperature of a power pack; determining, as a function of the temperature indication, whether if the temperature is within an elevated operating temperature range; and reducing a charge termination voltage and a charging current when the temperature is within the elevated operating temperature range.

There is provided herein a method including: receiving a temperature indication, the temperature indication being a function of a temperature of a power pack of a portable electronic device; determining, as a function of the temperature indication, whether the temperature is within an elevated operating temperature range; and reducing a charge termination voltage and increasing a termination current when the temperature is within the elevated operating temperature range.

Figure 1:
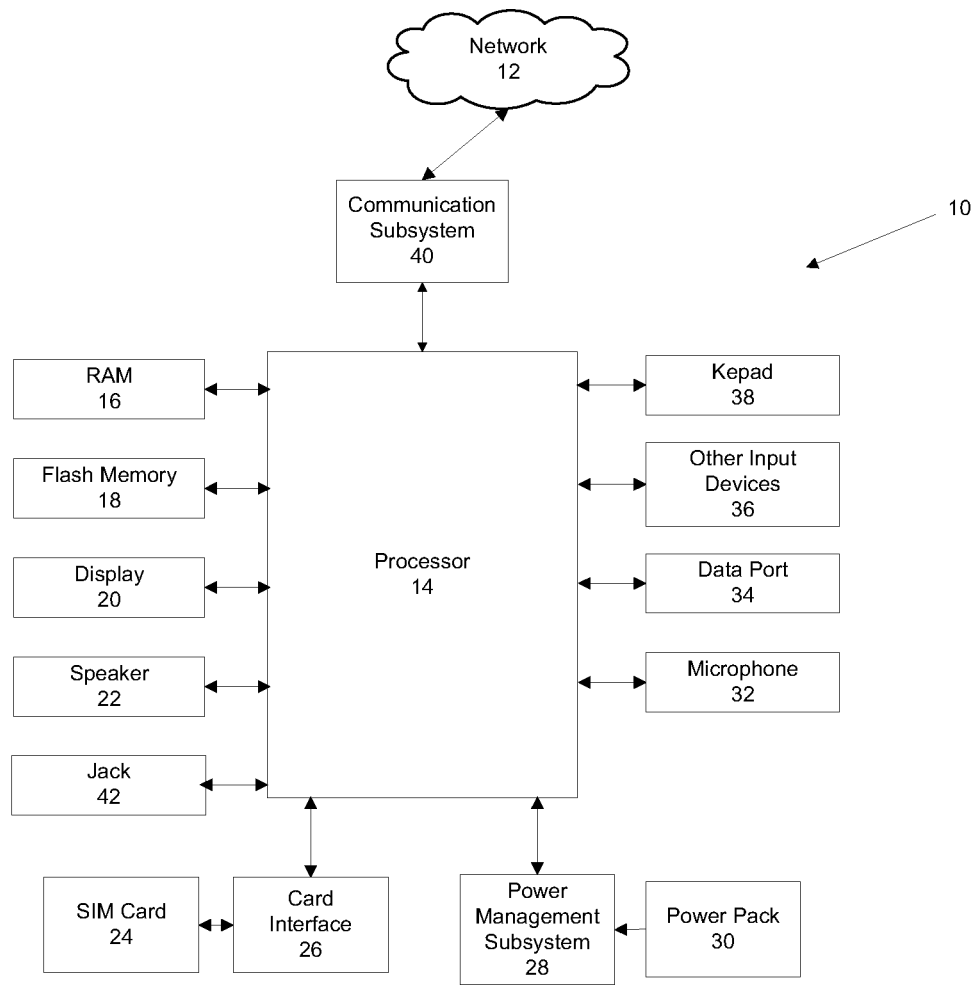
FIG. 1 is a block diagram of a portable electronic device according to an embodiment.

Referring now to FIG. 1, components of a portable electronic device 10 according to an embodiment are generally shown. The concepts described in further detail below may be applied with a variety of devices, and the concepts are not restricted to application with the illustrative portable electronic device. The portable electronic device 10 includes data communication capabilities and may communicate with other electronic devices directly or through a wireless network. The portable electronic device 10 is based on the computing environment and functionality of a handheld computer, such as a wireless personal digital assistant (PDA), for example. It will be understood, however, that the portable electronic device 10 is not limited to a wireless personal digital assistant. Other portable electronic devices are possible, such as cellular telephones, smart telephones, electronic messaging devices and laptop computers.

The portable electronic device 10 includes a number of components including processor 14, which controls the overall operation of the device 10. Although depicted for simplicity as a single unit, the processor 14 can be embodied as a plurality of processors, each processor controlling (or participating in the control of) one or more device operations. A communication subsystem 40 controls data and voice communication functions, such as email, PIN (Personal Identification Number) message functions, SMS (Short Message Service) message functions and cellular telephone functions, for example. The communication subsystem 40 is in communication with a wireless network 12, which may be a data-centric wireless network, a voice-centric wireless network or a dual-mode wireless network.

In FIG. 1, the communication subsystem 40 is a dual-mode wireless network that supports both voice and data communications. The communication subsystem 40 is configured in accordance with the Global System for Mobile Communication (GSM) and General Packet Radio Services (GPRS) standards. The communication subsystem 40 may alternatively be configured in accordance with Enhanced Data GSM Environment (EDGE) or Universal Mobile Telecommunications Service (UMTS) standards. Other wireless networks may also be associated with the portable electronic device 10, including Code Division Multiple Access (CDMA) or CDMA2000 networks. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The wireless network 12 includes base stations (not shown) that provide a wireless link to the portable electronic device 10. Each base station defines a coverage area, or cell, within which communications between the base station and the portable electronic device 10 can be effected. It will be appreciated that the portable electronic device 10 is movable within the cell and can be moved to coverage areas defined by other cells. Data is delivered to the portable electronic device 10 via wireless transmission from the base station. Similarly, data is sent from the portable electronic device 10 via wireless transmission to the base station.

The communication subsystem 40 further includes a short range communications function, which enables the device 10 to communicate directly with other devices and computer systems without the use of the wireless network 12 through infrared or Bluetooth™ technology, for example.

Prior to the portable electronic device 10 being able to send and receive communication signals over the wireless network 12, network registration or activation procedures must have been completed. In order to enable network communication, a SIM (Subscriber Identity Module) card 24 is inserted into a card interface 26. The SIM card, or Removable User Identity Module card, is used to identify the user of the mobile device, store personal device settings and enable access to network services, such as email and voice mail, for example, and is not bound to a particular portable electronic device 10.

The processor 14 is also connected to a Random Access Memory (RAM) 16 and a flash memory 18. An operating system and device software are typically stored in flash memory 18 and are executable by the processor 14. Some device software components may alternatively be stored in RAM 16. The portable electronic device 10 includes computer executable programmed instructions for directing the portable electronic device 10 to implement various applications. Some examples of applications that may be stored on and executed by the device 10 include: electronic messaging, games, calendar, address book and music player applications. Software applications that control basic device operation, such as voice and data communication, are typically installed during manufacture of the device 10. For devices that do not include a SIM card 24, user identification information may be programmed into the flash memory 18. The flash memory 18 may alternatively be a persistent storage, a Read-Only Memory (ROM) or other non-volatile storage.

The processor 14 receives input from various input devices including a keypad 38 and other input devices 36. The keypad 38 may be a complete alphanumeric keypad or telephone-type keypad. The other input devices 36 may replace or complement the keypad 38 to facilitate input and may include devices such as: single or multi-function buttons, a touch screen, a mouse, a trackball, a capacitive touch sensor or a roller wheel with dynamic button pressing capability. The portable electronic device 10 of FIG. 1 is shown by way of example and it will be appreciated by a person skilled in the art that many different device types, shapes and input device configurations are possible.

The processor 14 outputs to various output devices such as an LCD display screen 20. A microphone 32 and speaker 22 are connected to the processor 14 for cellular telephone functions. A data port 34 is connected to the processor 14 for enabling data communication between the portable electronic device 10 and another computing device. The data port 34 may include data lines for data transfer and a supply line for charging a power pack 30 of the portable device 10. The power pack 30 or a component thereof, may be removable from the portable electronic device 10. Power management subsystem 28 may be electrically coupled to a rechargeable power pack 30, and may provide an interface between an auxiliary charging device and the power pack 30. Power management subsystem 28 may perform any of several functions pertaining to power management, including controlling recharging of the power pack 30 or regulating power delivery to other components in the portable electronic device 10. Some of the functions of the power management subsystem 28 will be discussed below.

The portable electronic device 10 is operable in a data communication mode and a voice communication mode. In the data communication mode, a received data signal representing information such as a text message, an email message, a media file to be transferred, or web page download is processed by the communication subsystem 40 and input to the processor 14. The processor 14 further processes the signal and renders images for display on the display screen 20. Alternatively, the processed signals may be output to another computing device through the data port 34. In order to transmit information in the data communication mode, the user of the portable electronic device 10 composes information for transmission, such as email messages, for example, using the keypad 38 and other input devices 36 in conjunction with the display screen 20. The composed information is transmitted through the communication subsystem 40 over the wireless network 12 or via short range communications. Operation of the portable electronic device 10 in the voice communication mode is similar to the data communication mode, however, the received signals are output to the speaker 22, or an auxiliary device such as a headset or headphones, and signals for transmission are generated by the microphone 32. The portable electronic device 10 may also include other voice subsystems, such as a voice message recording subsystem, for example. Audio jack 42 is provided for receiving an audio accessory such as headphones, a headset, amplified speakers or amplified headphones, for example. Audio jack 42 may also receive other accessories such as a multi-media accessory including play, pause, stop and rewind buttons or a TV-out accessory that allows for connection of the portable electronic device to a TV, for example.

Only a limited number of device subsystems have been described. It will be appreciated by a person skilled in the art that additional subsystems corresponding to additional device features may also be connected to the processor 14.

Figure 2:
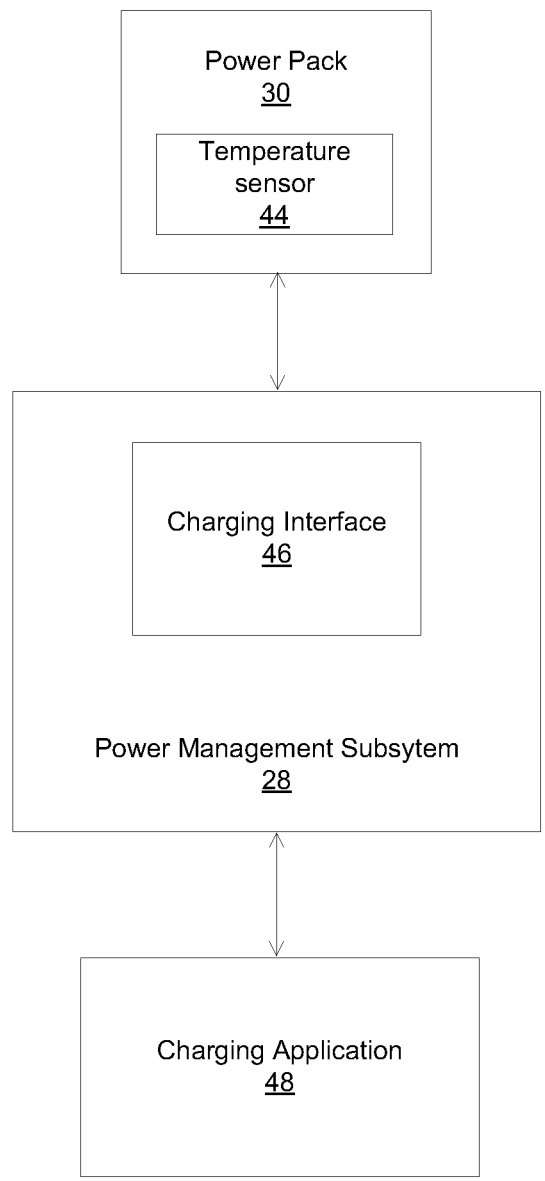
FIG. 2 is a block diagram including a charging application of the portable electronic device of FIG. 1.

Referring to FIG. 2, the power management subsystem 28, which regulates and distributes power throughout the portable electronic device 10, includes a charging interface 46 for communicating with the power pack 30. The power management subsystem 28 may operate under the direction of the processor 14. In a typical implementation, the power management subsystem 28 comprises one or more integrated circuits. The power management subsystem 28 may operate under the control of the processor 14 when the processor executes a charging application 48, which is stored on the portable electronic device 10 (e.g. in flash memory 18) and is executable by the processor 14.

A temperature sensor 44 is coupled to the power pack 30 to sense a temperature of the power pack 30. For simplicity, a single temperature sensor 44 is depicted in FIG. 2, but the concept may be adapted to a plurality of temperature sensors. As used herein, "couple" refers to a physical relation of components such that the condition of at least one component affects the function of the other. In the case of the temperature sensor 44 and the power pack 30, the components may be physically coupled in that they are proximate to one another, such that the temperature sensor 44 can sense a temperature of the power pack 30. The temperature sensor 44 may be physically close to the power pack 30, abutting the power pack 30, or a component of the power pack 30 (such as affixed to or embedded in the power pack housing). The temperature sensor 44 may be electrically coupled to components; for example, the temperature sensor 44 may be coupled electrically to the processor 14 by supplying or providing a temperature indication, in the form of an electrical signal, which is received by the processor 14. As used herein, "electrical coupling" refers to a relation of components such that at least one of the components can communicate with the other by way of an electrical signal. The electrical signal may be an essentially continuous signal, such as a modulated voltage or current signal, or an essentially discrete signal, such as an on-off or high-low voltage or current signal. The electrical signal may also include delivery of power. Two components may be electrically coupled to one another even if they are not connected directly to one another, and even if the electrical signal passes through one or more intermediary elements. The temperature sensor 44 may be coupled electrically to the processor 14 without necessarily being physically close to the processor 14 or abutting the processor 14.

The temperature sensor 44 senses a temperature of the power pack 30 by receiving as input a sensed temperature of the power pack 30 and by issuing as output a temperature indication. The temperature indication is generally a function of the temperature of the power pack 30. The temperature indication may be, but need not be, an electrical signal that changes as a function of the sensed temperature of the power pack 30. In some embodiments, there may be a range of temperature indications. In other embodiments, the temperature indication may be a simple logical signal that (for example) goes high when the sensed temperature is in elevated operating temperature range, and is otherwise low. The temperature indication may then be provided to the processor 14, which determines whether the temperature is within an elevated operating temperature range as a function of the temperature indication. As discussed below, this determination may affect the charging application 48, which may control the power management subsystem 28.

In one embodiment, the temperature sensor 44 is a thermistor. Other suitable temperature sensors 44 may alternatively be used including a thermocouple or a CMOS on-chip temperature sensor, for example. The temperature sensor 44 may be deployed anywhere on or in or proximate to the power pack 30, including, but not limited to, places in the power pack 30 that tend to be hotter or cooler than other places during use or during recharging. In some embodiments, the temperature sensor 44 may be a component of the power pack 30, such that removal of the power pack 30 or a component thereof disengages the temperature sensor 44 from the portable electronic device 10. In other embodiments, the temperature sensor 44 remains coupled to other components in the portable electronic device 10. In other words, in other embodiments, the temperature sensor 44 may be coupled to a non-removable component of the portable electronic device 10, including but not limited to a non-removable component of the power pack 30, such that removal of the power pack 30 or a component thereof does not disengage the temperature sensor 44 from the portable electronic device 10.

The power pack 30 may include, for example, one or more energy storage elements, for example, one or more battery cells. The power pack 30 may include a housing for the energy storage elements. Battery cells may store energy chemically, and are not limited to a particular type of battery chemistry. Battery types include: Lithium Ion-based batteries, Nickel Cadmium, Nickel Metal Hydride and Silver or Zinc-based batteries, for example. The power pack 30 may in addition to or alternatively include a fuel cell that uses hydrogen (from hydrides), methanol, ethanol or butane as fuel. For ease of description, the concepts described herein may be discussed in terms of a power pack that comprises a rechargeable battery.

Charging of the power pack 30 may be performed at a normal operating temperature and at an elevated operating temperature. The power management subsystem 28 may reduce a charge termination voltage when charging of the power pack 30 is performed above the normal operating temperature and within an elevated operating temperature range. Generally speaking, a charge termination voltage is the voltage at which charging is either terminated or at which charging is slowed. In a typical implementation, for example, a battery may be charged at a substantially constant current until the battery voltage reaches the charge termination voltage; after which the voltage of the battery may be held substantially constant at the charge termination voltage, and the charging current may be gradually decreased, until the charging current reaches the termination current. At this point, charging may be stopped. The power management subsystem 28 may also reduce a charging current when charging of the power pack 30 is performed above the normal operating temperature and within the elevated operating temperature range. Further, the power management subsystem 28 may increase a termination current when charging of the power pack 30 is performed above the normal operating temperature and within the elevated operating temperature range. Increasing the termination current may be performed in combination with one or both of: reducing the charge termination voltage and reducing the charging current.

Nominal or typical levels for the charge termination voltage and a maximum charge current are specified based on the type of battery. For example, Lithium Ion battery cells have a typical charge termination voltage of 4.2 Volts and a maximum charging current of 1 C and high voltage Lithium Ion battery cells have a typical charge termination voltage of 4.35V and a maximum charging current of 1 C. The C-rate is the theoretical amount of current that the battery can deliver to discharge 100% within one hour. In general, the maximum charging current may not be able to reach 1 C because it is limited by the auxiliary charging device. A typical auxiliary charging device imposes a 700 mA maximum on the charging current, however, different auxiliary charging devices may impose higher or lower limits.

Figure 3:
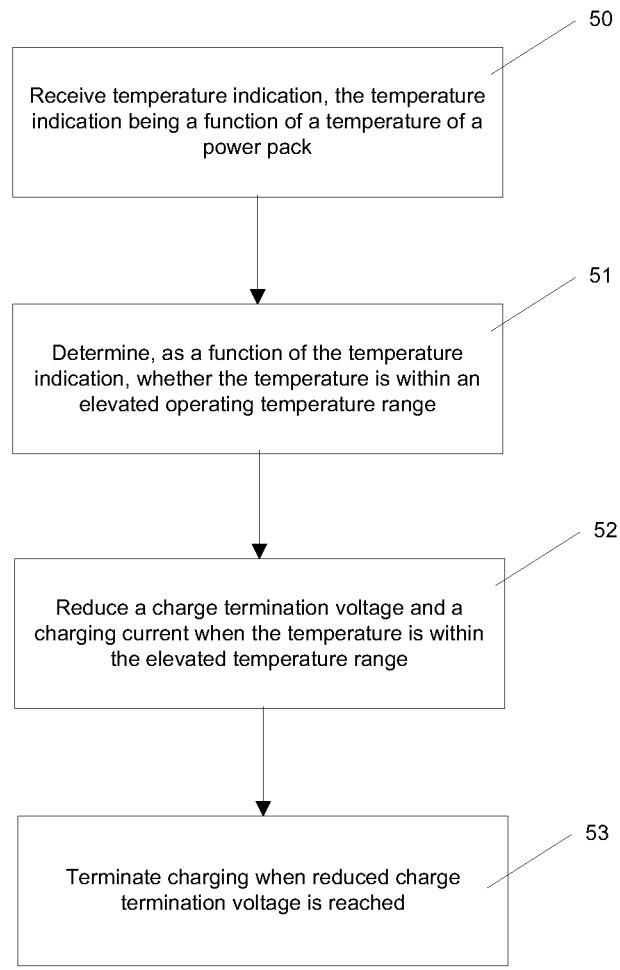
FIG. 3 is a flowchart depicting a method of charging the portable electronic device of FIG. 1 according to an embodiment.

In operation, the power pack 30 is electrically coupled with an auxiliary charging device and receives power therefrom. Referring to FIG. 3, the following method is executed while the power pack 30 is being charged. Although described as being carried out by the processor 14, the method may be carried out by a plurality of processors in the portable electronic device 10. The method includes: at step 50, the processor receives a temperature indication as a function of the temperature of the power pack 30. At step 51, the processor 14, which executes the charging application 48 and may control the power management subsystem 28, determines, as a function of the temperature indication, whether the temperature is within an elevated operating temperature range. At step 52, the processor 14 reduces a charge termination voltage and a charging current in response to the temperature being within the elevated operating temperature range. In other words, the charge termination voltage is set at a level that is lower than the typical charge termination voltage. At step 53, the processor 14 terminates the charging operation of the power pack 30 when a reduced charge termination voltage is reached. The processor 14 may control the power management subsystem 28 to terminate the charging operation.

The method of FIG. 3 may be embodied as computer-readable instructions, such as instructions included in the charging application 48. The battery charging application may be stored in flash memory 18 or another computer readable medium of the portable electronic device 10 and is executable by the processor 14. The charging application 48 may control the power management subsystem 28 to carry out the operations illustrated in FIG. 3.

As noted above, the power management subsystem 28 may reduce a charging current when charging of the power pack 30 is performed within the elevated operating temperature range. Reduction of the charging current may be performed instead of or in concert with reduction of the charge termination voltage. An illustration of reduction of the charging current in concert with reduction of the charge termination voltage will be discussed below.

What constitutes an elevated operating temperature may be defined differently for different circumstances. What constitutes an elevated operating temperature for one power pack might not constitute an elevated operating temperature for another power pack. In a typical embodiment, an elevated operating temperature range may be defined as 40° C. and higher (104° F. and higher). In a typical implementation, a range of elevated temperatures may also be defined that are extra-elevated. For example, an extra-elevated temperature range may be defined as 60° C. and higher (140° F. and higher). In a typical embodiment, control of charging may be changed if sensed temperatures reach the extra-elevated temperature range. For example, the charge termination voltage or charge current levels may be adjusted to different levels. In one embodiment, charging may be terminated entirely when sensed temperatures reach the extra-elevated temperature range.

Figure 4:
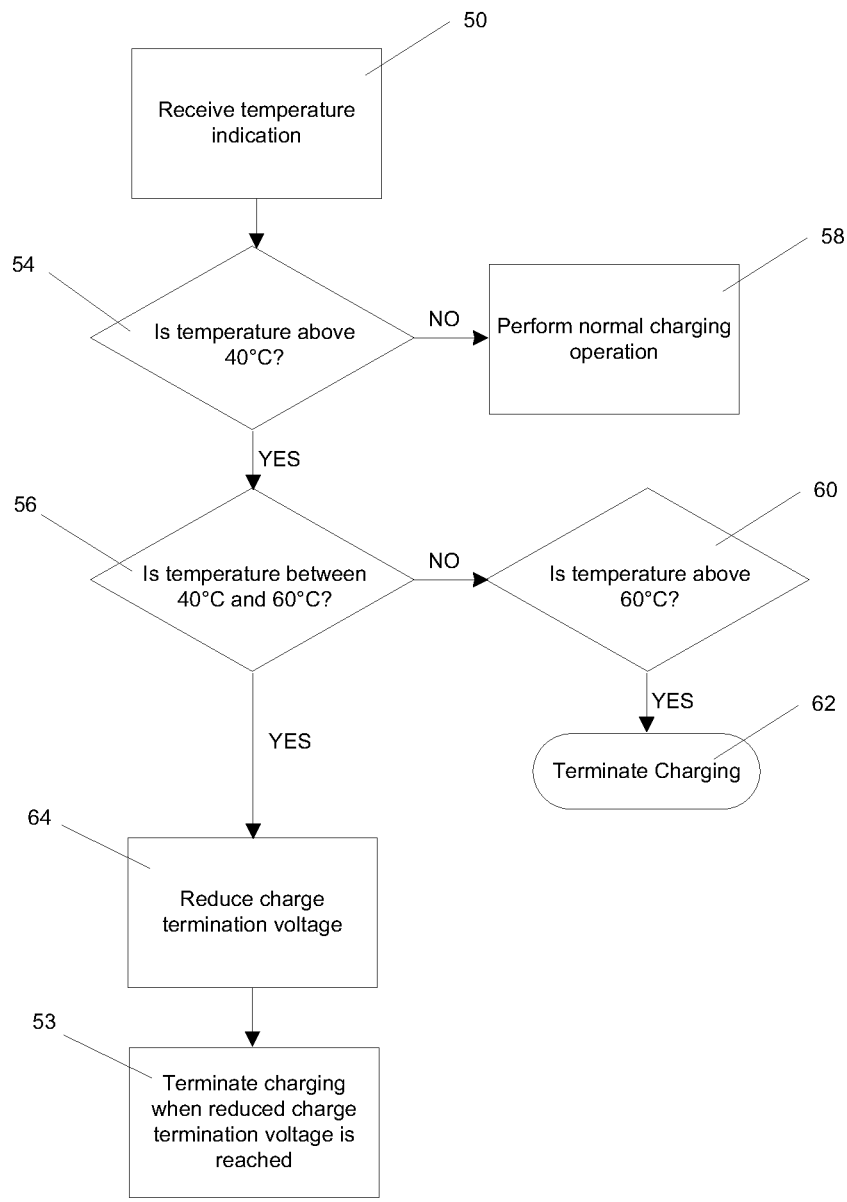
FIG. 4 is a flowchart depicting a method of charging the portable electronic device of FIG. 1 according to another embodiment.

FIG. 4 shows a method in which 40° C. is defined as the lowest temperature of the elevated temperature range and 60° C. is defined as the lowest temperature of the extra-elevated temperature range. The method includes: at step 50, receiving a temperature indication as a function of the temperature of the power pack 30. At step 54, the processor 14 determines whether the temperature is in the elevated temperature range, or above 40° C. in this example. If the temperature is not above 40° C., as indicated at step 58, then the power pack 30 is operating within a normal temperature range and a normal charging operation is performed. If the temperature is within the elevated operating temperature range of 40° C. to 60° C., as indicated as step 56, the processor 14 reduces the charge termination voltage as indicated at step 64. If the temperature is above 40° C. and above 60° C., as indicated at step 60, the charging operation is terminated, as indicated at step 62. Termination of the charging operation at extra-elevated temperatures may be done in order to avoid damage to the power pack 30 and/or avoid a potential fire hazard.

Similar to the method of FIG. 3, the method of FIG. 4 may be embodied as computer-readable instructions.

The reduction of charge termination voltage or charging current may vary according to several factors, including battery chemistry. In one example, the power pack 30 may include at least one Lithium Ion battery cell and have a typical charge termination voltage of 4.2 V. When a temperature in the elevated range is detected, the charge termination voltage may be reduced to between 4.0 V and 4.1 V, for example.

In another example, the power pack 30 may include at least one Silver-Zinc battery cell having a typical termination voltage of 2.0V. In this example, the charge termination voltage may be reduced to 1.85V when the temperature of the power pack 30 is operating within an elevated operating temperature range.

Figure 5:
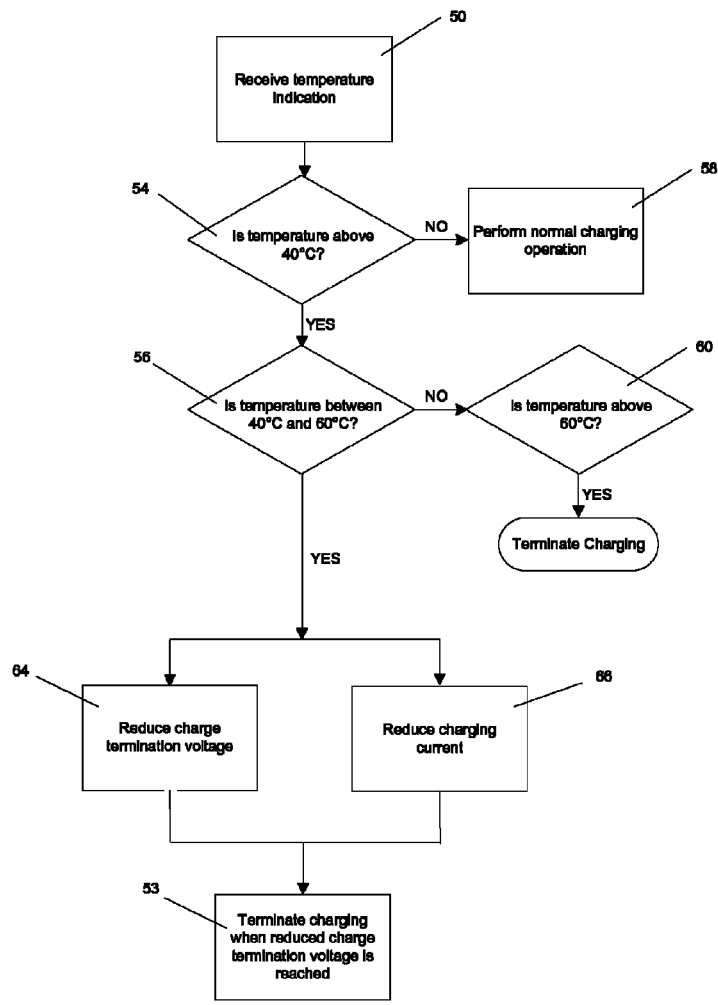
FIG. 5 is a flowchart depicting a method of charging the portable electronic device of FIG. 1 according to another embodiment.

In another embodiment, which is shown in FIG. 5, both the charge termination voltage and the charging current are reduced in response to the temperature being within the elevated operating temperature range. The method of FIG. 5 includes the steps of FIG. 4 and further includes step 66, in which the charging current is reduced. Similar to the method of FIG. 3, the method of FIG. 5 may be embodied as computer-readable instructions.

In one embodiment, a typical maximum charging current may be 1 C, or perhaps somewhat lower. The reduced charging current may be between 0.5 and 0.75 C, for example.

In operation, when operating within the elevated operating temperature range, the reduced charging current is applied until the maximum charge termination voltage is reached. When the reduced charging current is less than the charging current that is received from the auxiliary charging device, some or all of the remaining current may be directed to the device and/or grounded. For example, if a user is operating the portable electronic device 10 while the power pack 30 is charging, the portable electronic device 10 may be operated using the excess current and not drain the power pack 30.

Figure 6:
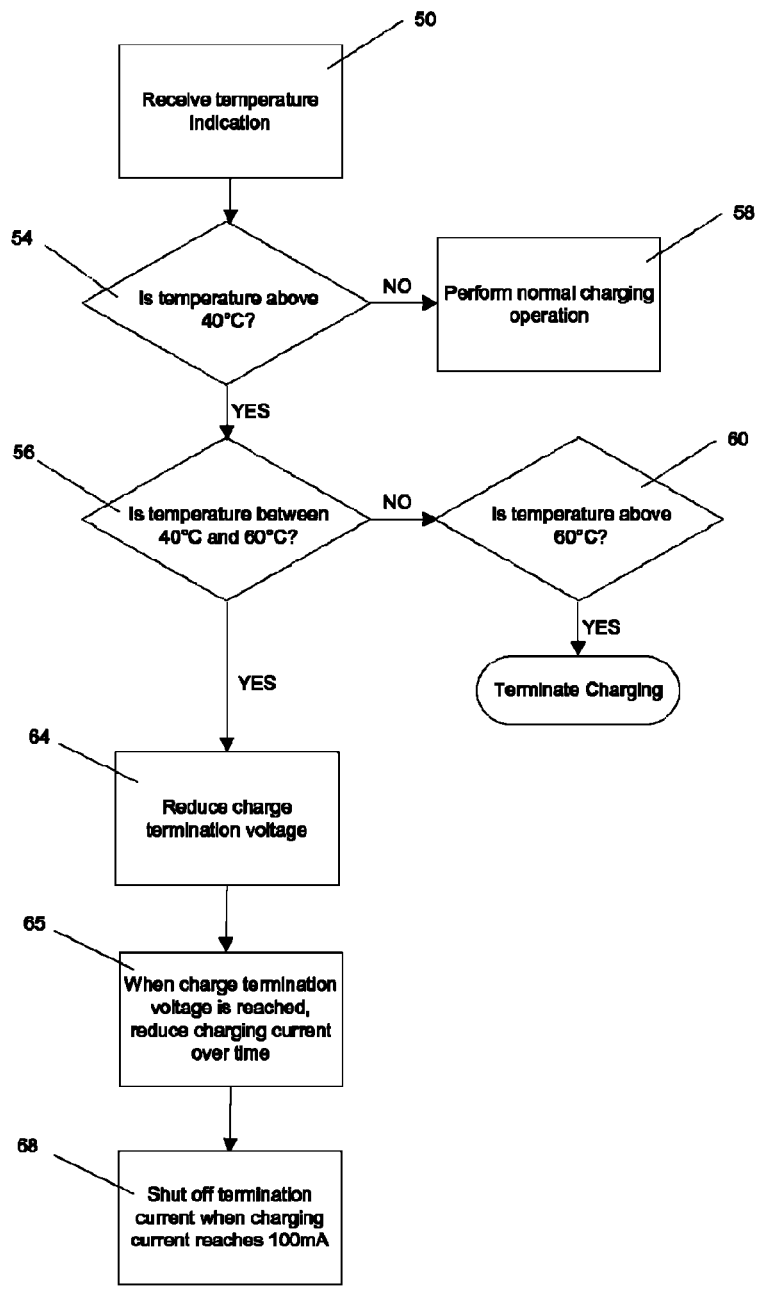
FIG. 6 is a flowchart depicting a method of charging the portable electronic device of FIG. 1 according to another embodiment.

In another embodiment, which is shown in FIG. 6, the charge termination voltage is reduced and a termination current is increased in response to the temperature being within the elevated operating temperature range. In this embodiment, the power pack 30 is charged and when the reduced charge termination voltage is reached, the charging current is reduced over time by the power management subsystem 28, as indicated at step 65. When the current reaches a shut-off termination current of 100 mA or higher, the current is shut off, as indicated at step 68. Similar to the methods of FIGS. 3, 4 and 5, the method of FIG. 6 may be embodied as computer-readable instructions.

At normal operating temperatures, the termination current of some typical devices is 20-50 mA (or 0.02 C to 0.05 C, for example). During charging of a battery at a substantially constant voltage, for example, the charging current may gradually decrease until the termination current is reached, at which point charging stops. By increasing the termination current, charging of the battery may be terminated sooner; and thereby charging may be performed within a shorter period of time. In some instances, early termination of charging may reduce the stresses on the battery and prolong the battery's useful life. Stresses on the battery may include physical and chemical stresses that may manifest in ways such as swelling or changes in performance.

In still another embodiment, the charge termination voltage and the charging current are reduced and the termination current is increased in response to the temperature being within the elevated operating temperature range.

The methods described herein may limit the depth of charge and, in some embodiments, the rate of charge in order to allow the power pack 30 to maintain normal cycle life and swelling while being charged at elevated temperatures. Various embodiments of the concepts may therefore prolong the usability of a power pack, and may reduce physical stresses that may affect other components of the portable electronic device. Various embodiments may further provide the benefit of safer recharging at elevated temperatures with little or no loss of performance.

By employing the methods described herein to charge power packs within an elevated operating temperature range, the occurrence of long term performance degradation that is associated with high temperature charging may be reduced and swelling of the power pack may be limited. Further, the ESR (Equivalent Series Resistance) generally may not increase at a higher rate than that of a power pack that is charged at a regular operating temperature.

Specific embodiments have been shown and described herein. However, modifications and variations may occur to those skilled in the art. For example, the temperature ranges, charge termination voltages and charging currents are all provided for illustrative purposes, and the concepts are not limited to the precise values or ranges described herein. All such modifications and variations are believed to be within the scope and sphere of the present embodiments.

The invention claimed is:

1. A method comprising:
   receiving a temperature indication, the temperature indication being a function of a temperature of a power pack of a portable electronic device;
   determining, as a function of the temperature indication, whether the temperature is within an elevated operating temperature range; and
   when the temperature is within the elevated operating temperature range, reducing a charge termination voltage and a charging current supplied to reach the charge termination voltage, and increasing a termination current.

2. A method as claimed in claim 1, further comprising terminating charging of the power pack when a reduced charge termination voltage is reached.

3. A method as claimed in claim 1, wherein receiving the temperature indication comprises receiving the temperature indication from a temperature sensor coupled to the power pack.

4. A method as claimed in claim 1, wherein the reduced charge termination voltage is between 4.0 Volts to 4.1 Volts for a lithium ion power pack.

5. A method as claimed in claim 1, wherein the elevated operating temperature range is 40° C. and higher.

6. A method as claimed in claim 1, further comprising:
   determining as a function of the temperature indication, whether the temperature is within an extra-elevated temperature range; and
   when the temperature is in the extra-elevated temperature range, terminating charging of the power pack.

7. A method as claimed in claim 6, wherein the extra-elevated temperature range is 60° C. and higher.

8. A method as claimed in claim 1, wherein the charging current is reduced to between 0.5 C and 0.75 C.

9. A method as claimed in claim 1, further comprising:
   continuing charging of the power pack until the termination current is reached.

10. A portable electronic device comprising:
    a processor, the processor electrically coupled to a temperature sensor coupled to a power pack;
    a power pack electrically coupled to the processor;
    wherein the processor
       receives a temperature indication from the temperature sensor, the temperature indication being a function of a temperature of the power pack;
       determines, as a function of the temperature indication, whether the temperature is within an elevated operating temperature range; and
       when the temperature is within the elevated operating temperature range, controls a power management subsystem to reduce a charge termination voltage and a charging current supplied to reach the charge termination voltage, and increase a termination current.

11. A portable electronic device as claimed in claim 10, wherein the portable electronic device further comprises the temperature sensor.

12. A portable electronic device as claimed in claim 10, wherein the portable electronic device further comprises the power pack.

13. A portable electronic device as claimed in claim 10, wherein the processor further:
    determines, as a function of the temperature indication, whether if the temperature is within an extra-elevated temperature range; and
    when the temperature is within the extra-elevated temperature range, terminates charging of the power pack.

14. A computer-readable medium having computer readable instructions stored thereon for execution by a processor to:
    receive a temperature indication, the temperature indication being a function of a temperature of a power pack;
    determine, as a function of the temperature indication, whether if the temperature is within an elevated operating temperature range; and
    when the temperature is within the elevated operating temperature range, reduce a charge termination voltage and a charging current supplied to reach the charge termination voltage, and increase a termination current.

15. The method of claim 1, wherein the termination current is increased to 100 mA.

* * * * *